Nov. 2, 1965 A. L. McCONNELL ETAL 3,215,584
COMPOSITE FABRIC AND METHOD OF MANUFACTURE THEREOF
Filed May 15, 1961

INVENTORS.
ALBERT L. McCONNELL
WHITNEY R. ADAMS
BY
Harold H. Jenkins
ATTORNEY

3,215,584
COMPOSITE FABRIC AND METHOD OF MANUFACTURE THEREOF

Albert L. McConnell, Chester, Pa., and Whitney R. Adams, Wilmington, Del., assignors to Scott Paper Company, Philadelphia, Pa., a corporation of Pennsylvania
Filed May 15, 1961, Ser. No. 110,141
6 Claims. (Cl. 161—64)

The present invention relates to synthetic textiles in the form of composite assemblies and more particularly to a laminar structure having a flocked surface.

Flocked textiles are well known and have been widely used for low-cost rugs, decorative appliques, substitutes for costly velvets, plushes and the like. Substrates other than fabrics, for example paper and plastic sheeting, have been surfaced with flocking in the production of other substitutes for textile materials.

The art of flocking has been acknowledged to offer many advantages over other textile manufacturing operations, such as weaving or knitting. For example, the speed of flocking is considerably greater than any of the other processes, various aesthetic effects are possible through multistage flock application, and high nap products are possible without the conventional wast and resulting cost of shearing.

Despite the many advantages in favor of greater utilization of flocked substrates, such products have failed to play a major part in the general textile field and even more noticeably in apparel applications. The primary reason for this lack of success is that none of the products presently offered have the required balance of properties for major utilizations in this established field. Lack of flexibility or "hand" has been one of the major deficiencies. When a textile-type fabric is coated with adhesive and flocked, the adhesive binds the fabric yarns together and occasions a loss in flexibility (hand). In those instances where good flexibility may be achieved, for example by flocking a high stretch substrate, such as vinyl plastic sheeting, the resultant product may have a favorable "hand" but it will customarily lack the proper balance of physical properties necessary to adapt it for wide scale applications. Because of the many limitations of products produced by the status of the present day art of flocking, the operation has failed to penetrate the textile field as a major process of manufacture.

Ordinarily a flock surfacting is produced by a random distribution of fibrous material, of any preferred type and dimensions over a layer of adhesive which has been applied to the particular substrate. The loading of fibrous material will determine, to a major extent, the density of the resultant surface although in some instances, orientation of the fibrous material in a plane normal to that of the substrate through an electrical or electrostatic field or by exposure to mechanical oscillation as is so well known to the art will contribute depth to the surface stratum since only a terminal bonding of the individual fibers of the flock ensues. But in these usual circumstances the adhesive layer must be relatively thick in order that adequate contact with the fibers will be possible and there will customarily be generated an impermeable membrane which not only unties the elements of the substrate but also reduces measurably the resiliency and natural drapability of such base. Some attempts have been made to modify the conventional adhesive compositions to compensate for these deficiencies and/or to devise improved adhesives but in most cases the desired objectives have not been achieved.

A principal object of the present invention is to produce a flocked composite of improved physical characteristics enabling a greater utility therefor.

Another object of our invention is to provide an intermediate carrier stratum for the surface flocking in a laminar structure designed to serve as a synthetic textile.

Other objects and advantages of this invention will be readily apparent from the following detailed description of certain preferred embodiments thereof when taken in conjunction with the accompanying drawing, wherein.

Our invention entails the interposition of a thin layer of a reticulated, three-dimensional, open-celled polyurethane resin foam structure between a customary base fabric or stratum and the flocking surface or stratum, the component layers being adhesively united in a laminar structure possessing optimum properties of strength and flexibility.

This resulting synthetic textile has been made into such products as women's and children's coats, skirts, as well as other articles of wearing apparel, blankets, upholstery material and rugs. These finished items demonstrate a balance of factors which elevates the commercial importance of our invention to the magnitude of present day textile manufacturing techniques. The laminar materials of our invention have an engineered strength to meet the performance requirements including a soft pliable "hand" for comfort, variable aesthetic effects to simulate a combination of expensive furs and knitwear, resistance to creasing or wrinkling, very low weight to warmth ratio and adaptability to cleaning by conventioinal laundering methods. The potential number of different fabric possibilities to be derived from our invention is almost limitless and any particular composite can be formulated in accordance with the overall requirements of the finished article.

Figure 3:
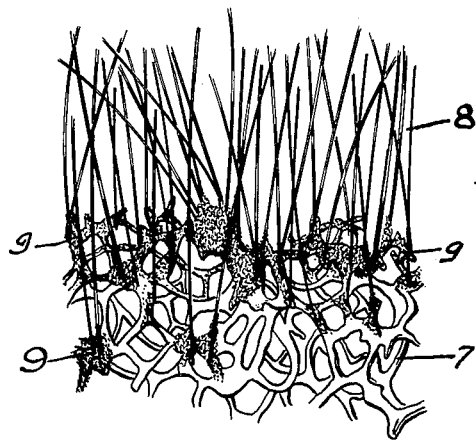
FIGURE 3 is a greatly enlarged sectional, detail view showing the manner of flock attachment to the intermediate foam stratum of the laminated.

Referring to the drawings, the laminate 5, which constitutes a new form of synthetic textile is composed of a substrate 6 of a woven fabric such as cotton, wool, rayon, nylon, or the like of any desired weight and finesses of wave, to which is secured by means of elastic adhesive a layer 7 of flexible, open-cell polyester polyurethane foam, which in turn is surfaced with a layer 8 of flock material. As best in FIGURE 3, the flock material 8 is secured in depth to the foam 7 through penetration of the cellulated surface of the foam both by the flock fibers and elastic adhesive applied thereto wetting the foam strands in areas 9.

Figure 1:
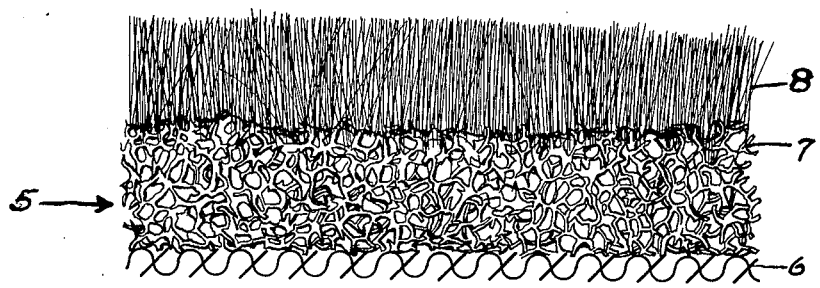
FIGURE 1 is an enlarged sectional view of a portion of a laminate constructed in accordance with the present invention.
Figure 2:
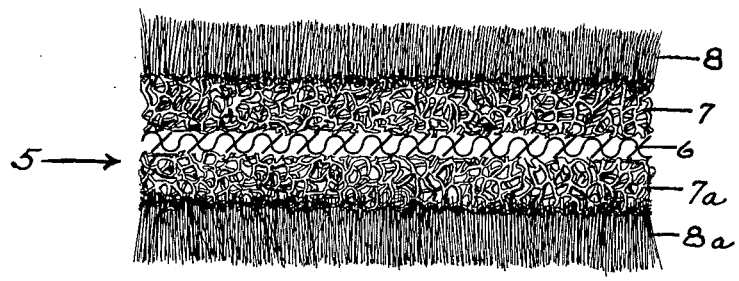
FIGURE 2 is an enlarged sectional view illustrating a modified form of the invention.

Referring to FIGURE 2, it will be seen that a second layer 7a of flexible open-cell polyester polyurethane foam may be secured to the substrate 6, and carry in turn a surfacing layer 8a of flock material. Again the several elements of the assembly are united by means of controlled applications of elastic adhesives.

As an illustrative example of the invention, a composite was prepared from a base stratum of 1 oz. bleached cotton of 30 picks per inch, an intermediate stratum of a 3/32" thick flexible open-cell polyester polyurethane foam having approximately 80 pores per linear inch and a flocking stratum of 3 denier rayon fibers averaging 2 mm. in length. The cotton lamina was secured to one surface of the foam by means of a bonding adhesive of a rubber latex disposed in such quantities therebetween (approximately ½ oz. of solids per square yard of surface area) as to achieve only attachment between contacting strands of the polyurethane foam and the cottom threads. Such limited application of adhesive insures against impregnation and subsequent stiffening of the cotton fabric. The remaining surface of the layer of foam was sprayed with the latex bonding adhesive and subsequently flock was metered thereon while the foam fabric laminate was undergoing a vertical vibration of some 5000 cycles per minute to effect orientation of the flock. The composite was thereafter heated in a circulating air oven maintained at 325° F. until the bonding adhesive was cured. Beating, brushing and vacuuming of the final product served to remove any flock fibers which were not adequately secured to the foam stratum, such excess flock being recoverable and available for reuse.

The resultant construction may be used as the outside or shell material in the manufacture of women's coats or similar apparel. Ordinarily such garments are lined for appearance and comfort but our composite will eliminate the need for a separate lining as the selected textile reinforcing media may be designed to perform this added function and, of course, it is also possible for the textile reinforcement to be of such character as to be suitable to serve as the exposed surface of the material.

In the production of another form of our invention a base stratum of leno fabric or scrim of rayon having 20 picks per inch in the warp and 10 picks per inch in the fill was covered on both sides with a 3/32″ layer of flexible, open-cell polyester polyurethane foam having approximately 80 pores per linear inch, and autogenous attachment was obtained through thermal fusion of the foam surface immediately before its emplacement upon the fabric substrate. The exposed surfaces of the foam layers were thereafter sprayed with latex bonding adhesive and again a flocking stratum of 2 denier nylon fibers averaging 4 mm. in length was metered thereon with suitable fiber orientation.

A laminar assembly of this type has proved most satisfactory as a blanket material, being considerably warmer and more durable than a woolen blanket of equal weight. Obviously the composite will also serve as a self-lined garment material, while further variations in foam thickness, flock weight, color and the like permit adjustment of the characteristics of the final product to meet various consumer requirements.

Other elastic adhesives may be substituted for the rubber latex to unite the several elements of the composite textile. These adhesive resinous or synthetic plastics may be applied either in solution or emulsion form by spraying, roll coating, striping, printing and comparable conventional techniques and subsequently the adhesive may be dried or cured. Many natural and synthetic rubber latices are commercially available and may be used alone or in combination. Several types of acrylonitrile interpolymers with butadiene form well known adhesives and also the polyvinyl, the phenol formaldehyde, aminoplast and polyurethane resins have been employed for their adhesive properties.

It is also possible to secure satisfactory attachment between the flock and foam elements of our synthetic textile through thermal fusion of the foam surfaces, the liquid adhesive so produced will again solidify upon cooling and will serve adequately as a substitute for other types of elastic adhesives.

It will be obvious that the flock can vary in size, weight, color and composition as desired and in amount of from 0.5 to 10.0 ozs. per square yard of surface as demanded for the hand and product appearance to be achieved. We have found that nylon, cellulose acetate, acrylic fibers and other commercially extruded or spun filaments, varying in length from ½ to 10 mm. provide suitable flock.

The substrate may be any type of woven or non-woven textile material as required by the specification of the laminar composite and the manner of use intended therefor. Closely woven cottons or woolens or the more loosely woven scrims and lenos have been utilized successfully.

Production of an open-cell polyester polyurethane foam of the type contemplated for use as the intermediate stratum of our composite assembly is described in detail in French Patent No. 1,176,044 and such material is now commercially available. As is well known, in a foam of this type, there is no plane surface but rather a series of cavities or cages. Accordingly when the foam is sprayed with adhesive, there will be material penetration of the body thereof controllable by density of application. It follows that upon flocking the fibers can also be forced into the foam to a controlled depth to assure bonding thereof at more than one point along the fiber length thus enabling an improved attachment of the flock material to the composite. Further the flexibility of the foam stratum provides a cushioning effect which relieves much of the stresses tending to rupture the adhesive bond of the flock fibers.

What we claim is:

1. A process for producing a composite fabric which comprises uniting at least one surface of a base stratum and a thin layer of reticulated foam having at its surface a series of cage-like cavities, applying an elastic bonding adhesive to said foam surface cavities without filling up voids of the reticulated foam cavities and applying generally vertically a fiber flock to said elastic adhesive, and randomly attaching the fibers of said flock within a preselected depth of the cavities in a manner which assures bonding of some of said fibers to said reticulated foam at more than one point thus providing improved attachment and an increased depth of cushioning affect.

2. A composite fabric comprising a substrate having on at least one side thereof an intermediate layer of flexible, drapable, reticulated foam having at its surface a series of cage-like cavities, and a flock stratum covering the exposed surfaces of said reticulated foam, the said flock stratum being adhesively attached generally vertically to said flexible, reticulated foam within a preselected depth of the cavities to assure bonding of some of said fibers to said reticulated foam at more than one point, and the said substrate being adhered to said reticulated foam, the above having improved attachment and an increased depth of cushioning affect.

3. A composite fabric according to claim 2, where the substrate is in the form of a scrim.

4. A composite fabric comprising a substrate, a flock stratum and an intermediate layer of reticulated foam disposed in between said foam having at its surface a series of cage-like cavities, wherein said flock stratum is flexibly and adhesively attached generally vertically to said flexible reticulated foam within a preselected depth of the cavities to assure bonding of some of said fibers to said reticulated foam at more than one point, the said substrate being adhered to said reticulated foam at varying depths the density of the flock is from about 0.5 to about 10.0 oz. per square yard of the fabric, the reticulated foam layer is about 3/32″ thick and the substrate is a 1 oz. bleached cotton of 30 picks per inch.

5. A composite fabric according to claim 2 where the substrate is in the form of a paper sheet.

6. A composite fabric according to claim 2 wherein said last adherence is by thermal fusion.

References Cited by the Examiner

UNITED STATES PATENTS

| | | | |
|---|---|---|---|
| 2,317,595 | 4/43 | Faris | 156—270 |
| 2,663,097 | 12/53 | Giese | 117—33 |
| 2,859,150 | 11/58 | Toulmin | 161—64 |
| 2,957,793 | 10/60 | Dickey. | |
| 2,999,763 | 9/61 | Sommer | 117—33 |
| 3,059,312 | 10/62 | Jamieson. | |
| 3,082,611 | 3/63 | Alvis et al. | 161—151 X |

EARL M. BERGERT, *Primary Examiner.*